United States Patent [19]

Menchetti

[11] Patent Number: 4,603,229
[45] Date of Patent: Jul. 29, 1986

[54] UTILITY MODULE FOR WALLS

[75] Inventor: Robert J. Menchetti, North Olmsted, Ohio

[73] Assignee: Donn Incorporated, Wesklake, Ohio

[21] Appl. No.: 693,873

[22] Filed: Jan. 23, 1985

[51] Int. Cl.⁴ ............................................. H02G 3/22
[52] U.S. Cl. ......................................... 174/48; 339/36
[58] Field of Search ..................... 174/48, 49, 66, 67; 339/36, 39, 123; 52/221

[56] References Cited

U.S. PATENT DOCUMENTS

| | | | |
|---|---|---|---|
| 1,718,254 | 6/1929 | Putnam | 174/49 |
| 3,293,588 | 12/1966 | Blonder | 174/66 X |
| 3,462,892 | 8/1969 | Meyer | 174/49 X |
| 4,255,611 | 3/1981 | Propst et al. | 174/48 |

FOREIGN PATENT DOCUMENTS 713389 8/1954 United Kingdom ................. 174/59

Primary Examiner—Arthur T. Grimley
Assistant Examiner—D. A. Tone
Attorney, Agent, or Firm—Pearne, Gordon, Sessions, McCoy, Granger & Tilberry

[57] ABSTRACT

An electrical service module for wall installation is disclosed. The module includes upper and lower plate assemblies which extend between adjacent studs and are supported at their ends on such studs. Various types of electrical outlets are mounted on such plate assemblies and are supplied with conductors which extend along the wall cavity. A cover is removably installed to cover the opening of the module, and provides a resilient seal around its periphery to seal the module opening. The cover is spaced from the wall along at least two edges and the seal is locally compressed by conductors or cords extending into the module along such edges.

11 Claims, 3 Drawing Figures

UTILITY MODULE FOR WALLS

BACKGROUND OF THE INVENTION

This invention relates generally to wall structures, and more particularly to a novel and improved utility module for walls.

PRIOR ART

Various types of electrical outlets are wall-mounted. Some outlets supply conventional power and various types of appliances and lights are plugged into such outlets. Others are phone outlets into which telephones are plugged. Further, it is often desirable to interconnect and network computers, and this sometimes requires substantial wiring. Generally in the past, each type of electrical outlet was separately mounted in the wall and separate connections were provided for each such outlet.

SUMMARY OF THE INVENTION

In accordance with this invention, a novel and improved electrical utility module is provided. Such module is relatively large and provides a large opening through which cords and cables extend to plug into the various electrical supplies provided within the module. Typically, the module extends between adjacent wall studs, and may have substantially any desired height. Top and bottom plates which extend between adjacent studs are provided within the module. Such plates are typically 16-24 inches long. Various types of receptacles and outlets are mounted on such plates and are open to the interior of the module.

A given utility module may provide at least one or more power receptacles. For example, one receptacle may provide 110-volt alternating current, and the other may provide 220-volt alternating current. In addition, outlets may be provided for telephone lines, computer connections, and television antenna and/or cable connections.

Because the plates in which the receptacles and outlets are mounted are relatively large and spaced apart a substantial distance, ample room is provided to mount all of such types of services with substantial spacing therebetween. Because substantial spacing is possible between the various services, the module meets safety requirements.

An attractive, removable cover is provided which snaps into place when mounted. Such cover includes a soft, resilient seal which extends around the cover periphery and engages the wall around the module to provide a seal for the module. When the module cover is installed, the cover other than the seal is spaced from the wall surface along the upper and lower edges. Consequently, cords and cables may extend from the interior of the module between the outer wall surface and such edges of the cover to the exterior. In such instance, the soft, resilient seal is locally deformed by the cord.

The present module is particularly useful when applied to walls supported by metal studs, often referred to as "demountable walls." Further, such modules can be positioned adjacent to work stations and work surfaces at which various types of electronic equipment, such as computer terminals and word processing terminals, are located.

These and other aspects of this invention are illustrated in the accompanying drawings, and are more fully described in the following specification.

DETAILED DESCRIPTION OF THE DRAWINGS

Figure 1:
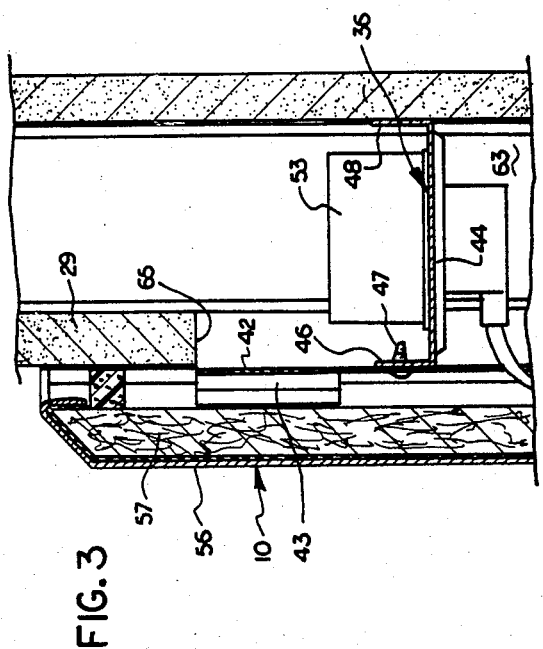
FIG. 1 is a fragmentary, perspective view, illustrating a typical installation of a utility module in accordance with the present invention adjacent to a work surface.

FIG. 1 illustrates a typical utility module installation in accordance with this invention. The module includes a removable cover 10 mounted on the wall 11 to close the module located immediately behind the cover. The illustrated module is provided with an outlet for a phone, an outlet for a computer network, and also alternating current power. In this typical installation, the cover 10 is mounted immediately above a work surface 12. A computer 13 resting on the work surface 12 is plugged into the module by cords 14a and 14b which extend under the edge of the cover 10, as described in greater detail below. Similarly, a phone 16 is plugged into the module by means of a cord 17, again extending under the lower edge of the cover 10.

As discussed in greater detail below, the cover 10 can be easily removed and reinstalled so as to provide access to the module within the wall. Further, the module is relatively large in size and has sufficient room to permit the installation of substantially all of the various types of electric service which might be required.

Figure 3:
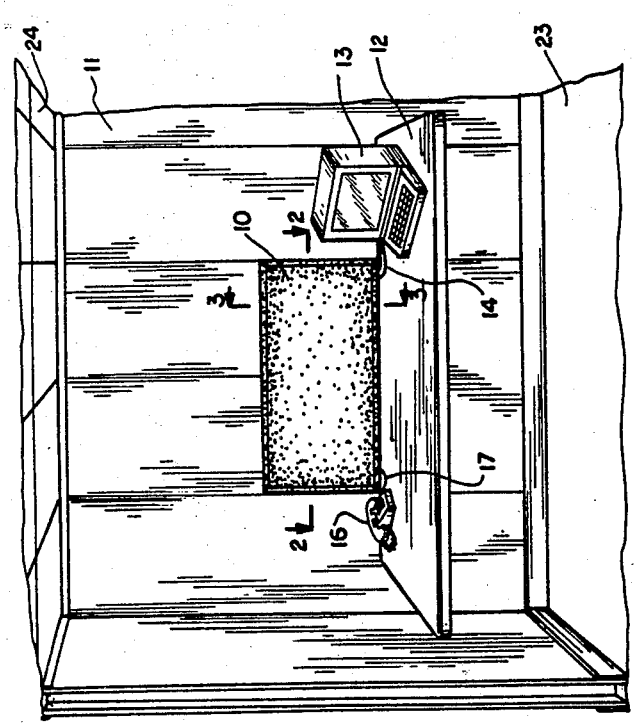
FIG. 3 is a vertical section through the module.
Figure 2:
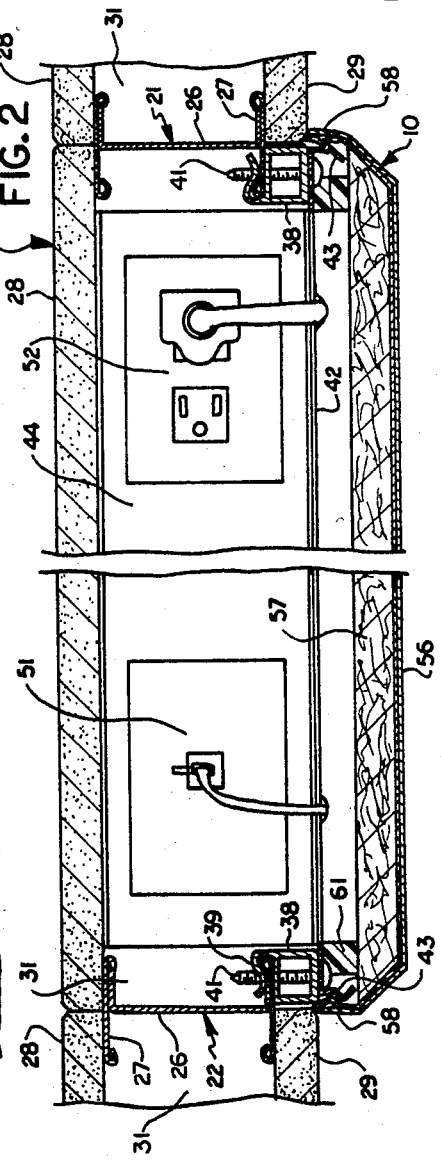
FIG. 2 is a horizontal section through the module.

Referring to FIGS. 2 and 3, the wall in which the module is provided includes a pair of vertically extending, spaced metal studs 21 and 22 which extend along the wall 11 from the floor 23 to the ceiling 24. Such studs are typical metal studs used in the fabrication of demountable walls. The studs are generally H-shaped, providing a central web 26 and opposed flanges 27 against which two rows of wall panels 28 and 29 are mounted. The panels 28 cooperate to provide one wall surface and the panels 29 cooperate to provide the opposite wall surfce. Such panels in cooperation with the studs also define the wall cavity 31.

The module itself provides an upper plate assembly 36 and a similar lower plate assembly 37, each of which extends between adjacent studs 21 and 22, and is supported at its ends on such studs. The support structure is best illustrated in FIG. 2 and includes a spacer 38 mounted on the forward flange of the associated studs 21 and 22 and providing a thickness equal to the thickness of the adjacent panels 29 so that they provide a forward face flush with the exposed surface of the panels 29. The illustrated spacer is rectangular in cross section and is provided with a mounting arm 39 which snaps over the adjacent flange edge. Subsequently, a fastener 41 is also driven through the spacer 38 and the flange 27 of the stud to complete the mounting operation.

Each of the plate assemblies 36 and 37 includes a vertically extending face plate 42 which extends at its ends along the outer surface of the spacers 38 and is secured thereto by the screw fasteners 41. The face plate 42 is also provided with a snap-type end connection 43 which allows the cover 10 to be snapped into its mounted position. Each of the plate assemblies 36 and 37 also includes a horizontally extending sheet metal member 44 having flanges along each edge. One of the flanges 46 is connected to the adjacent face plate 42 by screws 47 and the other flange 48 bears against the inner surface of the adjacent panel 28.

Mounted along the two members 44 are receptacles or outlets for the various services supplied to the module. For example, in the illustrated embodiment, a phone outlet 51 and a duplex receptacle 52 are mounted at spaced locations on the member 44 of the lower assembly 37. Similarly, a computer network outlet 53 (illustrated in FIG. 3) is mounted on the member 44 of the upper assembly. Additional outlets, such as television outlets or power sources of different voltages and the like, can be mounted on the two members 44 at spaced locations, so that sufficient spacing is provided to meet safety standards.

The panels 29 above and below the module which define the module opening 64 terminate at upper and lower edges 65, which are spaced substantially above and below the associated members 44, and the face plates are sized to extend at least to the edges 65. Therefore, a wall cavity zone 66 is defined around the module which is deeper than the wall cavity 31. Such zone 66 can therefore accommodate relatively deep outlet boxes, such as the outlet box 67. For such purpose, the face plates should have a depth greater than the vertical depth of the boxes.

The cover 10 is preferably formed of a sheet metal pan 56 enclosing a composition board 57. The pan 56 is also provided with edge projections 58 which snap over the end connections 43 on opposite ends of the plates 42 when the cover is snapped into place. Further, it is easily removed by merely snapping the mounting lock apart by pulling outward on the edges of the cover.

The top and bottom edges of the pan 56 are bent back along the board 57 so as to provide a space between the cover and the adjacent wall panel 29 along both the top and bottoms of the cover. Further, a foam rubber seal 61 is secured to the inner side of the cover and extends along each edge thereof to provide a good seal between the wall and the cover. Such seal 61 is preferably formed of relatively soft foam rubber material so that cords can easily pass out of the module to the exterior zone and merely result in a localized compression of the seal 61.

As best illustrated in FIGS. 2 and 3, the cables 14a and 14b, respectively, plug into the duplex receptacle 52 and the computer network outlet 53, while the cable 17 plugs into the phone outlet 51. The provision of this seal effectively seals the module without interfering with the ability to bring cords out anywhere along the top or bottom surface of the cover.

With this structure, the two studs 21 and 22 cooperate with the assemblies 36 and 37 to define a module cavity 63 which is separated from the wall cavity 31 and can have substantially any size required for the various services. For example, in a typical installation, the studs may be 24 inches apart, so the module is 24 inches wide. Further, the spacing between the two assemblies 36 and 37 can be adjusted to substantially any desired spacing and, therefore, any required module cavity size is easily achieved. Further, if desired, similar spacers, face plates, and a cover can be provided in the opposite side of the wall by forming a similar opening in the panels 28, and such module is accessible from both sides.

Since the face plates 42 are flush with the outer surface of the panels 29, the depth of the module is greater than the depth of the main wall cavity, and exceeds such depth by the thickness of the panels 29. This additional thickness allows for the convenient mounting of conventional size receptacles or, in some instances, over-sized receptacles if required.

With this invention, a service module is easily supplied in a conventional wall structure at substantially any desired location. Further, the opening 64, which is covered by the cover 10, can be relatively large. Still further, the cover 10 can be, and preferably is, provided with an attractive finish which may also be contrasting in color from the remainder of the wall.

Although the preferred embodiment of this invention has been shown and described, it should be understood that various modifications and rearrangements of the parts may be resorted to without departing from the scope of the invention as disclosed and claimed herein.

What is claimed is:

1. A wall service module comprising a pair of spaced substantially parallel studs, wall panels mounted on opposite sides of said studs cooperating to define an interior wall cavity, a pair of spaced, substantially parallel plates extending between said studs and substantially perpendicular thereto, said studs and plates cooperating to define a module cavity separated from said wall cavity, an opening in at least one of said panels providing access to said module cavity, a plurality of service outlets mounted on said plates connected to electrical cable extending along said wall cavity, and a cover removably mounted on said opening providing access to said module cavity when removed and closing said module cavity when mounted, said cover permitting cords to extend from the wall exterior into said module cavity when said cover is mounted in position over said opening.

2. A wall service module as set forth in claim 1, wherein spacers having a thickness substantially equal to the thickness of said panel adjacent to said opening are secured to said studs, and said plates provide a face portion mounted on said spacers flush with the surface of said panels adjacent to said opening.

3. A wall service module as set forth in claim 2, wherein said module cavity is deeper than said wall cavity, said face portions cooperating to define a zone of increased wall cavity depth adjacent said module cavity allowing installation of wider service outlets.

4. A wall service module as set forth in claim 3, wherein said plates include two separate sheet metal pieces, one of which provides said face portion and the other of which supports said service outlets.

5. A wall service module as set forth in claim 4, wherein said cover provides a resilient seal engaging the wall around said opening, said resilient seal being locally compressibly by cords extending into said module.

6. A wall service module as set forth in claim 1, wherein said cover provides a resilient seal engaging the wall around said opening, said resilient seal being locally compressible by cords extending into said module.

7. A wall service module as set forth in claim 6, wherein said cover is spaced from said wall along at least two opposite edges to allow cords to extend past said edges into said module.

8. A wall service module assembly comprising: a pair of elongated support plate assemblies adapted to be mounted at their ends on adjacent wall studs in spaced parallel relationship, a cover adapted to be removably mounted on a wall to close said module, each of said plate assemblies and cover providing end connectors which releasably interlock to releasably connect said cover to said plate assemblies, said plate assemblies being adapted to support outlet boxes for supplying various types of electrical connections to said module, said cover providing a peripheral seal engageable with a wall to seal the module and being locally deformable by cords extending past said seal into said module.

9. A wall service module comprising a wall providing spaced vertically extending studs, first and second spaced parallel rows of wall panels mounted on opposite sides of said studs, an opening in one panel of said first row between adjacent studs, and a module assembly including plate means mounted on said adjacent studs which extend across the space between said rows and cooperate with the rearward side of panels of said second row to define part of a module cavity having a module cavity opening surrounded by a surface in the plane of said one panel, female service receptacles mounted on said plate means and open to said cavity adapted to connect with electrical cords extending into said cavity through said cavity opening, and a removable cover mounted on said plate means and extending beyond said cavity opening along said surface and spaced from said surface, said cover providing a peripheral resilient seal engageable with said surface around said cavity opening to seal said cavity and being locally deformable by cords extending past said seal into said cavity.

10. A wall service module as set forth in claim 9, wherein said adjacent studs cooperate with said plate means and the rearward surface of a panel of said second row to define said cavity.

11. A wall service module as set forth in claim 10, wherein said plate means provide horizontally extending, vertically spaced portions in which said receptacles are mounted.

* * * * *